(12) United States Patent
Shiomi et al.

(10) Patent No.: US 10,394,426 B2
(45) Date of Patent: **\*Aug. 27, 2019**

(54) DISPLAY FOR INPUT SELECTION ON A COMPACT INFORMATION PROCESSING DEVICE

(71) Applicant: International Business Machines Corporation, Armonk, NY (US)

(72) Inventors: Tatsuyuki Shiomi, Kawasaki (JP); Kenji Takada, Saitama (JP)

(73) Assignee: International Business Machines Corporation, Armonk, NY (US)

( \* ) Notice: Subject to any disclaimer, the term of this patent is extended or adjusted under 35 U.S.C. 154(b) by 77 days.

This patent is subject to a terminal disclaimer.

(21) Appl. No.: 15/838,538

(22) Filed: Dec. 12, 2017

(65) Prior Publication Data

US 2018/0101287 A1    Apr. 12, 2018

Related U.S. Application Data

(63) Continuation of application No. 15/818,978, filed on Nov. 21, 2017, which is a continuation of application
(Continued)

(30) Foreign Application Priority Data

May 28, 2014  (JP) .................................. 2014-110315

(51) Int. Cl.
*G06F 3/0484* (2013.01)
*G06F 3/0488* (2013.01)
*G06F 3/0482* (2013.01)

(52) U.S. Cl.
CPC ........ *G06F 3/0484* (2013.01); *G06F 3/04883* (2013.01)

(58) Field of Classification Search
None
See application file for complete search history.

(56) References Cited

U.S. PATENT DOCUMENTS

| 5,596,656 A | 1/1997 | Goldberg |
| 6,643,824 B1 | 11/2003 | Bates et al. |

(Continued)

FOREIGN PATENT DOCUMENTS

| JP | 10111854 A | 4/1998 |
| JP | 11105646 A | 4/1999 |

(Continued)

OTHER PUBLICATIONS

Shiomi et al., "Display for Input Selection on a Compact Information Processing Device", U.S. Appl. No. 16/365,729, filed Mar. 27, 2019.

(Continued)

*Primary Examiner* — Nhat Huy T Nguyen
(74) *Attorney, Agent, or Firm* — Stosch Sabo

(57) ABSTRACT

Embodiments are provided for a system, a computer program product, and/or a method that improves a display of an input selection displayed on a compact screen. To improve this display, embodiments search displayed content for input items, wherein the input items are selections inputted by a user; display different marks, each associated with each of the input items; receive a subsequent input from the user; and change a selection state of each item of the input items corresponding to a mark of the different marks in response to the subsequent input received corresponding to that mark.

1 Claim, 13 Drawing Sheets

Related U.S. Application Data

No. 14/709,080, filed on May 11, 2015, now Pat. No. 9,916,067.

(56) References Cited

U.S. PATENT DOCUMENTS

| | | |
|---|---|---|
| 9,377,976 B2 | 6/2016 | Sanuki |
| 2009/0055771 A1 | 2/2009 | Nurmi |
| 2011/0066983 A1 | 3/2011 | Kim |
| 2011/0302534 A1 | 12/2011 | Ooguchi et al. |
| 2013/0227488 A1 | 8/2013 | Tomar et al. |
| 2013/0286435 A1 | 10/2013 | Anezaki et al. |
| 2015/0355802 A1 | 12/2015 | Shiomi et al. |

FOREIGN PATENT DOCUMENTS

| | | |
|---|---|---|
| JP | 11134157 A | 5/1999 |
| JP | 2000194488 A | 7/2000 |
| JP | 2003345506 A | 12/2003 |
| JP | 2004280482 A | 10/2004 |
| JP | 2004326587 A | 11/2004 |
| JP | 2007086976 A | 4/2007 |
| JP | 2008167391 A | 7/2008 |
| JP | 4132150 B2 | 8/2008 |
| JP | 2010160564 A | 7/2010 |
| JP | 2010537289 A | 12/2010 |
| JP | 5332956 B2 | 1/2011 |
| JP | 2011065439 A | 3/2011 |
| JP | 5082529 B2 | 11/2012 |
| JP | 2013232047 A | 11/2013 |
| JP | 2014071727 A | 4/2014 |
| WO | 2007055002 A1 | 5/2007 |

OTHER PUBLICATIONS

IBM, List of IBM Patents or Patent Applications Treated as Related, Mar. 26, 2019, 2 pages.

Decision to Grant a Patent, Application No. 2014-110315, dated Oct. 22, 2016, translated Jan. 14, 2017. 6 pages.

Notification of Reasons for Refusal, Application No. 2014-110315, dated Jun. 24, 2016, translated Jan. 14, 2017. 6 pages.

Inoue et al., "Interface design development by PowerPoint", vol. 1, Kogyo Chosakai Publishing Co. Ltd., Jul. 15, 2009, 1 page, Summary.

Tatsuyuki et al., "Information Processing Device, Program, and Method", Application No. 2014-110315, Filed May 28, 2014, 38 pages, English Translation.

List of IBM Patents or Patent Applications Treated as Related, dated Dec. 11, 2017, 2 pages.

"Graffiti 2", Wikipedia, last edited Aug. 10, 2017, printed on Nov. 17, 2017, 2 pages. https://en.wikipedia.org/wiki/Graffiti_2.

"Graffiti (Palm OS)", Wikipedia, last edited Jun. 30, 2017, printed on Nov. 17, 2017, 3 pages. https://en.wikipedia.org/wiki/Graffiti_%28Palm_OS%29.

Technology, MyScript, Copyright MyScript, printed on Nov. 17, 2017, 7 pages. https://www.myscript.com/technology/.

Pointer Browser 2—Android Apps on Google Play, printed Nov. 17, 2017, 3 pages. https://play.google.com/store/apps/details?id=yourgames.PointerBrowserConcept&hl=en.

Shiomi et al., "Display for Input Selection on a Compact Information Processing Device", U.S. Appl. No. 15/818,978, filed Nov. 21, 2017.

DISPLAY FOR INPUT SELECTION ON A COMPACT INFORMATION PROCESSING DEVICE

BACKGROUND

The present disclosure relates to information processing and, more specifically, to an improved display for input selection on a compact information processing device.

In general, as devices become more compact, the display of input items becomes smaller and the selection of input items becomes more difficult using a touch panel.

SUMMARY

According to an embodiment, a system comprising a memory having computer readable computer instructions and a processor for executing the computer readable instructions is provided. The system is configured to search displayed content for input items, wherein the input items are selections inputted by a user. The system is further configured to display different marks, each associated with each of the input items; receive a subsequent input from the user; and change a selection state of each item of the input items corresponding to a mark of the different marks in response to the subsequent input received corresponding to that mark.

According to an embodiment, a computer program product is provided. The computer program product comprises a computer readable storage medium having program instructions embodied therewith. The program instructions executable by a processor to cause the processor to search displayed content for input items, wherein the input items are selections inputted by a user. The program instructions executable by the processor further cause the processor to display different marks, each associated with each of the input items; receive a subsequent input from the user; and change a selection state of each item of the input items corresponding to a mark of the different marks in response to the subsequent input received corresponding to that mark.

According to an embodiment, a method is provided. The method includes searching displayed content for input items, wherein the input items are selections inputted by a user. The method further includes displaying different marks, each associated with each of the input items; receiving a subsequent input from the user; and changing a selection state of each item of the input items corresponding to a mark of the different marks in response to the subsequent input received corresponding to that mark.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The following is an explanation of an improved display for input selection on a compact information processing device in an embodiment of this disclosure with reference to the drawings. The following embodiments do not limit the disclosure in the scope of the claims. Also, all combinations of characteristics explained in the embodiments are not necessarily required in the technical solution of the various possible embodiments.

Figure 1:
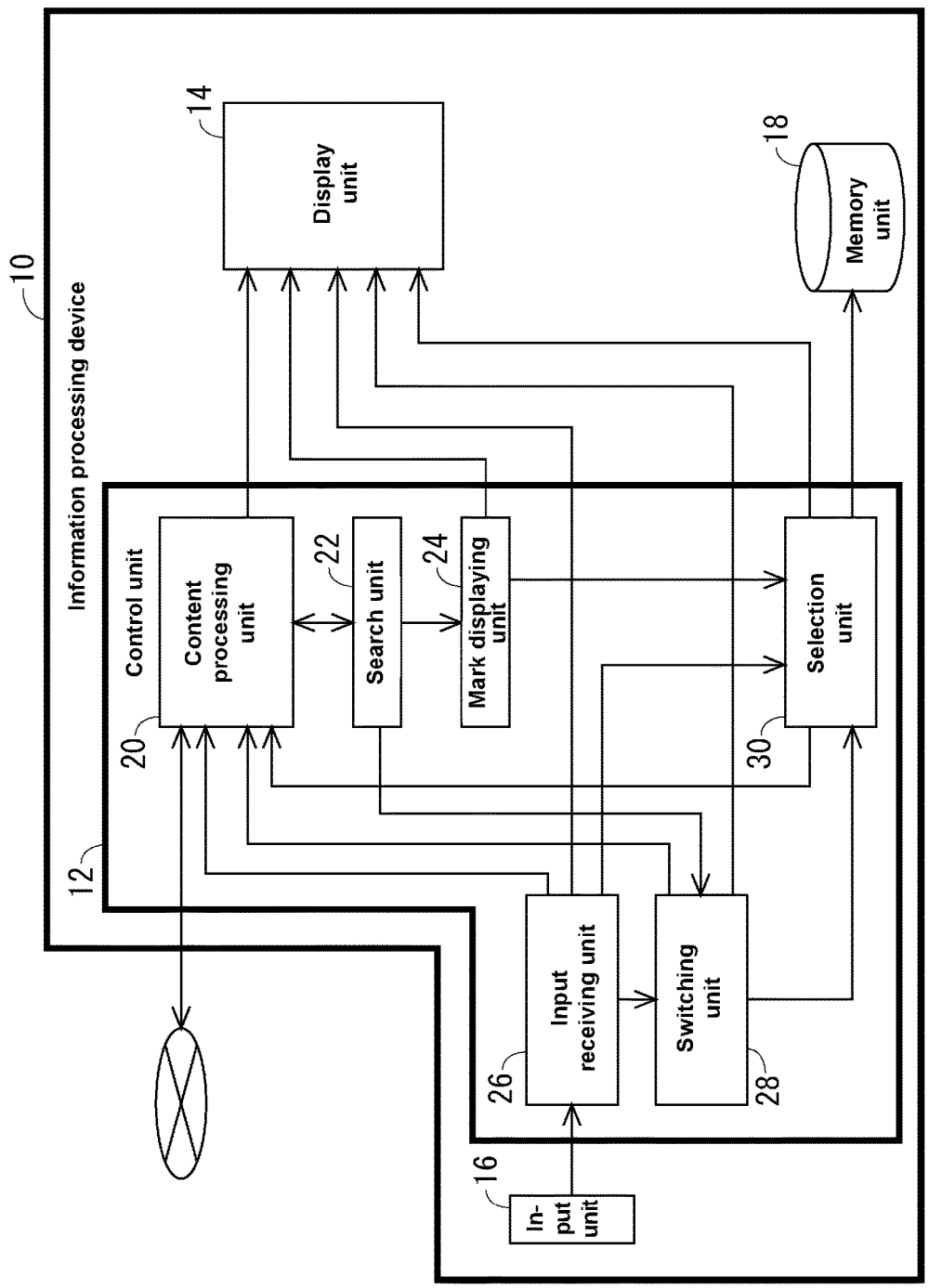
FIG. 1 is a diagram of an overall configuration of an information processing device in accordance with an embodiment.

FIG. 1 is a diagram of the overall configuration of an information processing device 10 in accordance with an embodiment. The information processing device 10 displays marks "MK" applied to input items "IT" in content, and receives the input of marks MK from the user. In this way, the information processing device 10 can be used by the user to easily change the selection state of input items IT corresponding to marks MK. Examples of information processing devices 10 are small electronic devices such as, but not limited to mobile phones, tablets, and smart phones.

As shown in FIG. 1, the information processing device 10 includes a control unit 12, a display unit 14, an input unit 16, and a memory unit 18.

An example of a control unit 12 is a processing device such as a central processing unit (CPU). The control unit 12 shown in FIG. 1 includes a content processing unit 20, a search unit 22, and a mark displaying unit 24. The control unit 12 also includes an input receiving unit 26, a switching unit 28, and a selection unit 30. The control unit 12 can also read a program stored in the memory unit 18 to operate as the content processing unit 20, the search unit 22, the mark displaying unit 24, the input receiving unit 26, the switching unit 28, and the selection unit 30. Some or all of the content processing unit 20, the search unit 22, the mark displaying unit 24, the input receiving unit 26, the switching unit 28, and the selection unit 30 can be configured from hardware such as circuitry.

The content processing unit 20 displays content on the display unit 14. The content processing unit 20 can obtain data such as a webpage containing input items such as a questionnaire via a network such as the internet. The content processing unit 20 displays this webpage on the display unit 14 as content. Another example of content is a webpage requiring the user to enter information into an e-commerce order form, or an internet reservation form. Another example of content is a setting screen for setting icons for the input buttons in the user interface of an operating system (OS). Another example of a content processing unit 20 is a browser used to browse webpages. The content processing unit 20 outputs acquired content to the search unit 22.

The search unit 22 searches the displayed content for input items IT used by the user to enter selections. For example, the search item 22 searches checkboxes or radio buttons in a markup language, such as hypertext markup language (HTML). The search unit 22 outputs the retrieved input items IT to the mark displaying unit 24. One example of input items IT is items selected by the user in a questionnaire.

The mark displaying unit 24 displays on the display unit 14 different marks MK associated with each of the input items IT retrieved by the search unit 22. For example, the mark displaying unit 24 displays on the display unit 14, as a mark MK, a number assigned to each of the input items IT. The mark displaying unit 24 outputs the mark MK information to the selection unit 30.

The input receiving unit 26 receives input from the user such as instructions via the input unit 16. The input receiving unit 26 outputs the input such as received instructions to the content processing unit 20, the switching unit 28, and the selection unit 30. For example, the input receiving unit 26 establishes an input area for the user to input marks MK on the screen of the display unit 14. The input receiving unit 26 receives input corresponding to marks MK from the user in the input area. The input receiving unit 26 receives gestures as input corresponding to marks MK, more specifically, numerical gesture input.

In response to user instructions received, for example, via a switching button displayed on the display unit 14, the switching unit 28 switches between assist mode in which marks MK are displayed and gesture input is received, and normal mode in which marks MK are not displayed and mark MK input is not received. The switching unit 28 outputs switching mode information to the content processing unit 20 and the selection unit 30. An example of the normal mode is the mode in which webpages are browsed using normal browser operations. Assist mode performs normal browser operations in addition to receiving mark MK input.

In response to receiving mark MK input from the input receiving unit 26, the selection unit 30 changes the selection state of input items IT corresponding to marks MK. The selection states of input items IT include a selected state and an unselected state. For example, in response to the input receiving unit 26 receiving a gesture as input corresponding to a mark MK, the selection unit 30 changes the selection state of the input item IT corresponding to the mark MK. The selection unit 30 stores the input from the user and the marks MK of the input items IT in the selected state in the memory unit 18 and displays them on the display unit 14. The selection unit 30 displays the marks MK for the selected state on the display unit 14, and no longer displays a mark MK when a cancel instruction has been received for the mark MK. The selection unit 30 also receives instructions from the user, and confirms the selection of input items IT corresponding to marks MK changed to the selected state based on a gesture input from the user. In addition, the selection unit 30 outputs the confirmed input items IT in the selected state to the content processing unit 20.

The display unit 14 displays images obtained from the content processing unit 20, the mark displaying unit 24, the input receiving unit 26, the switching unit 28, and the selection unit 30. Examples of display units 14 include liquid display panels and organic EL display panels.

The input unit 16 receives input from the user. An example of an input unit 16 is a touch panel. The input unit 16 is provided on the front face of the display unit 14, e.g., over the entire surface of the device facing the user. The input unit 16 may be provided in a location other than the front face of the display unit 14. The input unit 16 outputs the input received from the user to the input receiving unit 26.

The memory unit 18 is an example of a storage unit. The memory unit 18 stores programs executed by the control unit 12 and parameters used to execute the programs.

Figure 2:
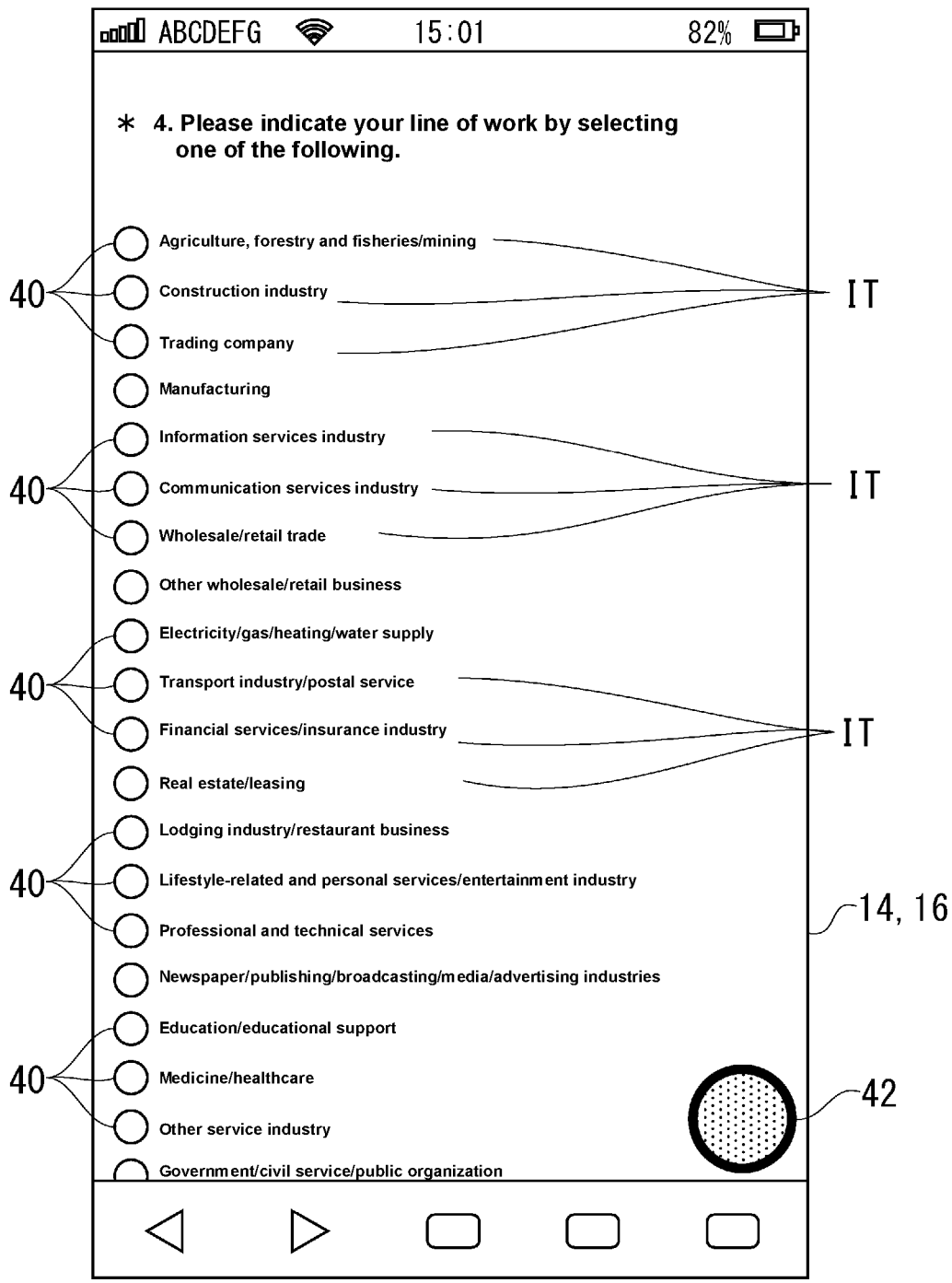
FIG. 2 is an example of a screen displayed on a display unit in a normal mode in accordance with an embodiment.

FIG. 2 is an example of a screen displayed on the display unit 14 in normal mode in accordance with an embodiment. In normal mode, the content processing unit 20 displays content including a plurality of input items IT on the screen of the display unit 14. The content shown in FIG. 2 is a questionnaire asking the user to select his or her business. The content processing unit 20 displays round radio buttons 40 to the left of each input item IT. The radio buttons 40 are an example of input buttons. In the content shown in FIG. 2, the input items IT are types of business such as "agriculture, forestry and fisheries/mining," "construction industry," and "trading company." The user browses the content shown in FIG. 2 and touches the radio button 40 of the input item IT matching his or her business to select the type of business.

The switching unit 28 also displays on the display unit 14 a switching button 42 over the content. The switching button 42 is an example of an input object. When the user briefly touches the switching button 42 once (e.g., performs a single tap), the switching unit 28 switches from the normal mode to the assist mode in which mark MK input is received.

Figure 3:
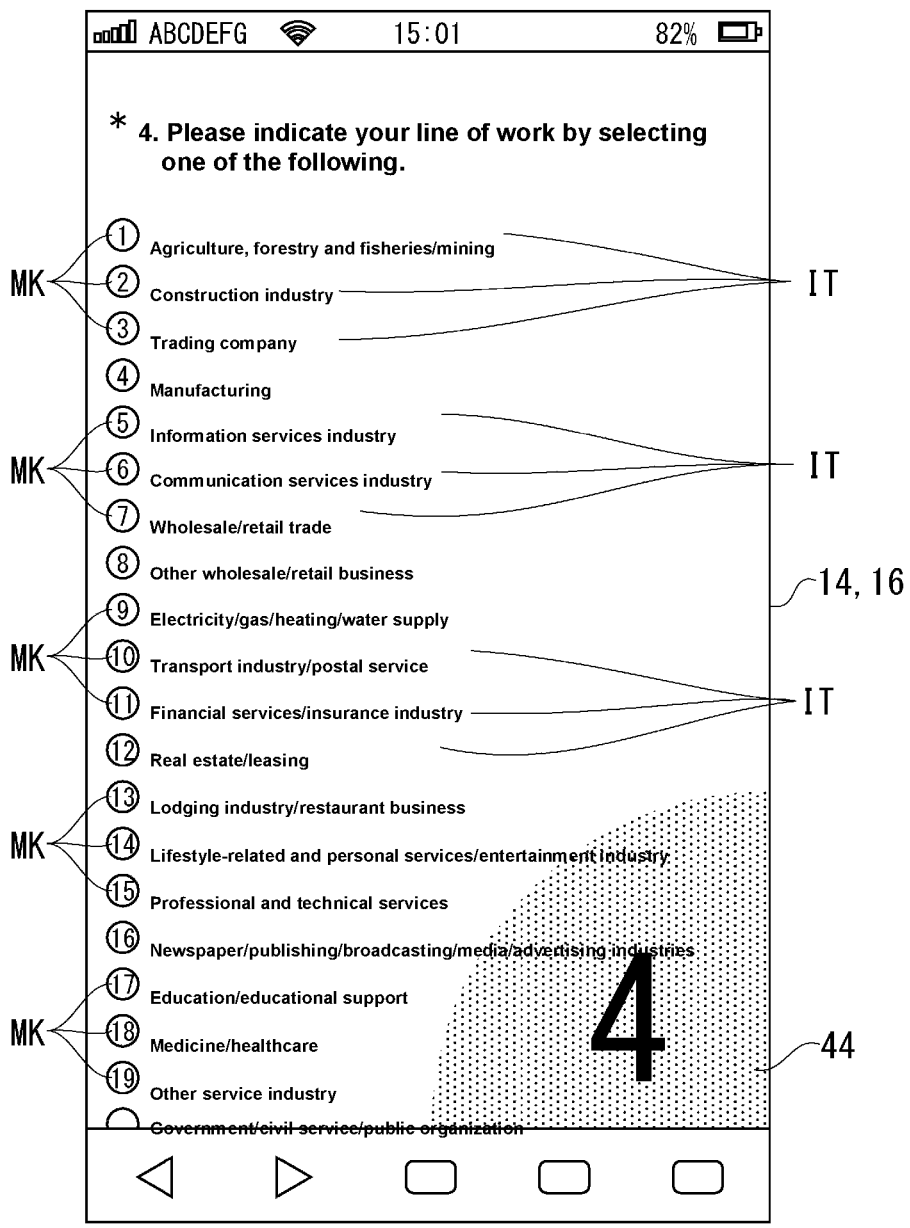
FIG. 3 is another example of a screen displayed on a display unit in an assist mode in accordance with an embodiment.

FIG. 3 is an example of a screen displayed on the display unit 14 in assist mode in accordance with an embodiment. In assist mode, the content processing unit 20 displays the same content as the normal mode on the screen of the display unit 14. In assist mode, the mark displaying unit 24 displays marks MK on the display unit 14. In the example shown in FIG. 3, the mark displaying unit 24 displays, as marks MK, consecutive numbers 1 through 19 next to the radio buttons 40 for each of the input items IT. The selection unit 30 establishes and displays a partially circular input area 44 in the lower right corner of the screen on the display unit 14 indicated by the dot shading. When user input such as gesture input in the input area 44 is received by the input receiving unit 26, the selection unit 30 determines whether or not the input corresponds to one of the marks MK. When it has been determined that the input corresponds to one of the marks MK, the mark MK is displayed in the input area 44. In the example shown in FIG. 3, the selection unit 30 receives and displays "4" as the mark MK.

Figure 4:
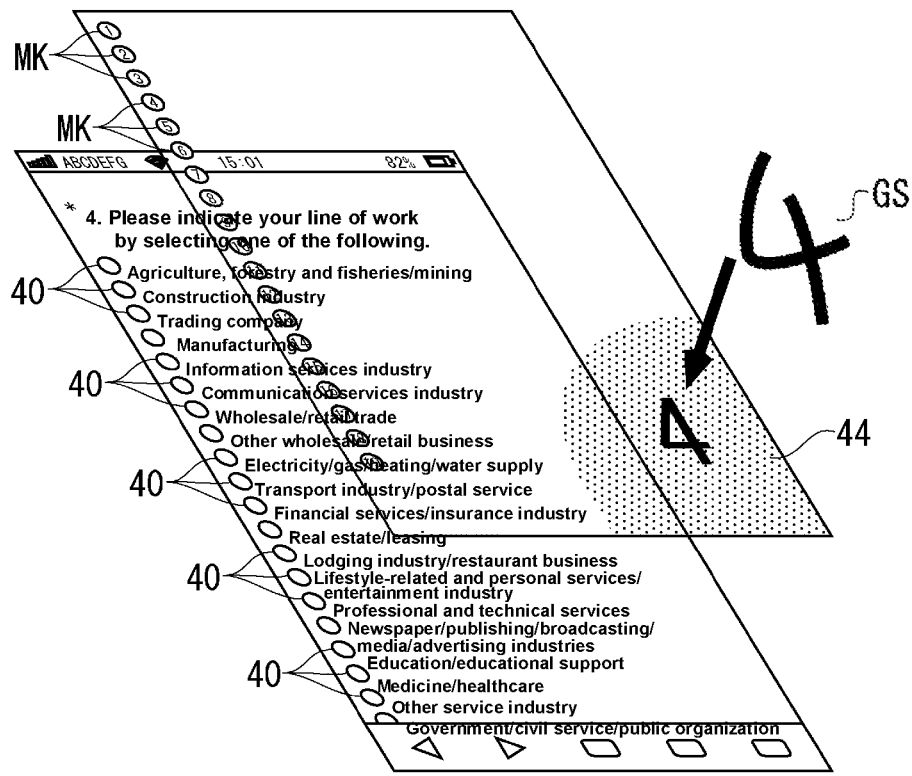
FIG. 4 is a diagram that depicts a relationship between content, marks, and an input in accordance with an embodiment.

FIG. 4 is a diagram that depicts a relationship between content, marks MK, and an input area 44 in accordance with an embodiment. As shown in FIG. 4, the input area 44 and the marks MK are displayed above the content on the screen of the display unit 14. Therefore, the mark displaying unit 24 superimposes the same round mark MK on the display unit 14 above the radio buttons 40 to the left of each of the input items IT in the content. The selection unit 30 also superimposes the input area 44 over the images in the overlapping area of content on the display unit 14. In this case, the selection unit 30 preferably displays the input area 44 as a transparent image. In this way, the selection unit 30 can display the input area 44 so that the underlying content can be viewed in the input area 44.

The input area 44 shown in FIG. 4 is also above the content during input from the input unit 16. Consequently, the input receiving unit 26 outputs input such as gesture input GS from the user as received by the input unit 16 in the input area 44 to the selection unit 30. For example, when the user slides (swipes) the touch point vertically in the input area 44 of the input unit 16, the input receiving unit 26, and not the content processing unit 20, inputs the input to the selection unit 30. In this way, the content processing unit 20 does not scroll the content vertically during the input. Further, the selection unit 30 determines whether or not the gesture input GS corresponds to any one of the marks MK.

Figure 5:
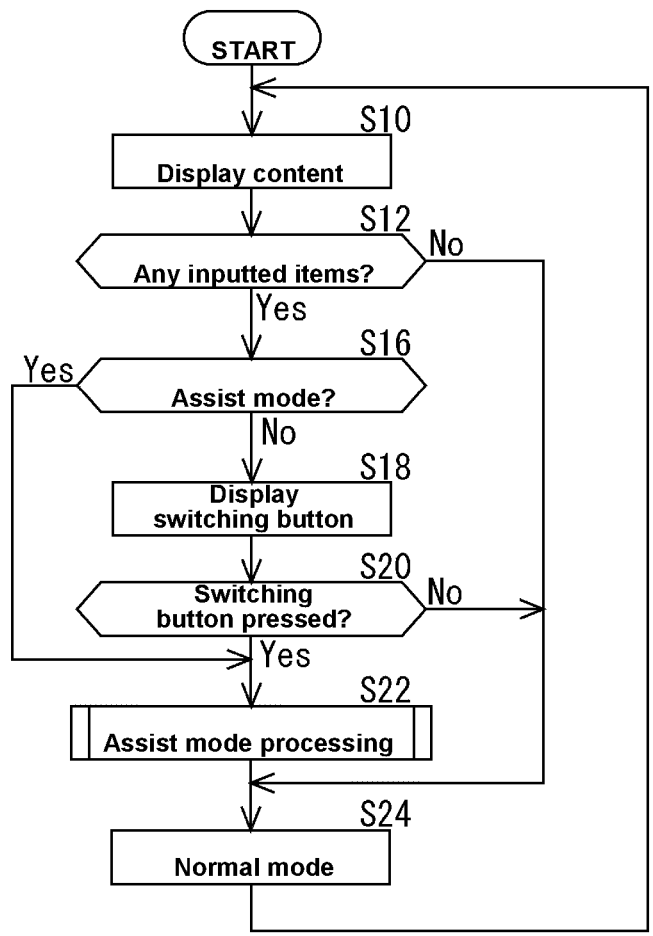
FIG. 5 is a flowchart of a main content processing performed by a control unit in accordance with an embodiment.

FIG. 5 is a flowchart of an embodiment of the main content processing performed by the control unit 12. When the user briefly touches (taps) the area in which an icon is displayed on the browser (where the browser is operating as the content processing unit 20), the control unit 12 starts content processing by reading and executing a program stored in the memory unit 18.

During content processing, as shown in FIG. 5, the content processing unit 20 displays on the display unit 14 content acquired via the network (block S10). Next, the search unit 22 searches for input items IT in the content to determine whether any input items IT are present (block S12). When the search unit 22 determines that no input items IT are present (block S12: No), the results are outputted to the content processing unit 20. The content processing unit 20 continues in normal mode and displays the content normally (block S24). However, when the search unit 22 determines that input items IT are present (block S12: Yes), the results are outputted to the switching unit 28.

The switching unit 28 determines whether or not the current mode is the assist mode (block S16). When the switching unit 28 determines that the current mode is the assist mode (block S16: Yes), the assist mode processing described below is executed and assist mode is continued (block S22).

When the switching unit 28 determines that the current mode is not the assist mode (block S16: No), the switching button 42 is displayed (block S18). Next, when instruction input entered by the user using the input unit 16 is received via the input receiving unit 26, the switching unit 28 determines whether or not the input is a touch in the area of the switching button 42 (block S20). When the switching unit 28 determines that the input is not a touch in the area of the switching button 42 (block S20: No), the processing in block S24 is executed. When it determines that the input is a touch in the area of the switching button 42 (block S20: Yes), the switching unit 28 switches to the assist mode and executes the assist mode processing described below (block S22).

Figure 6:
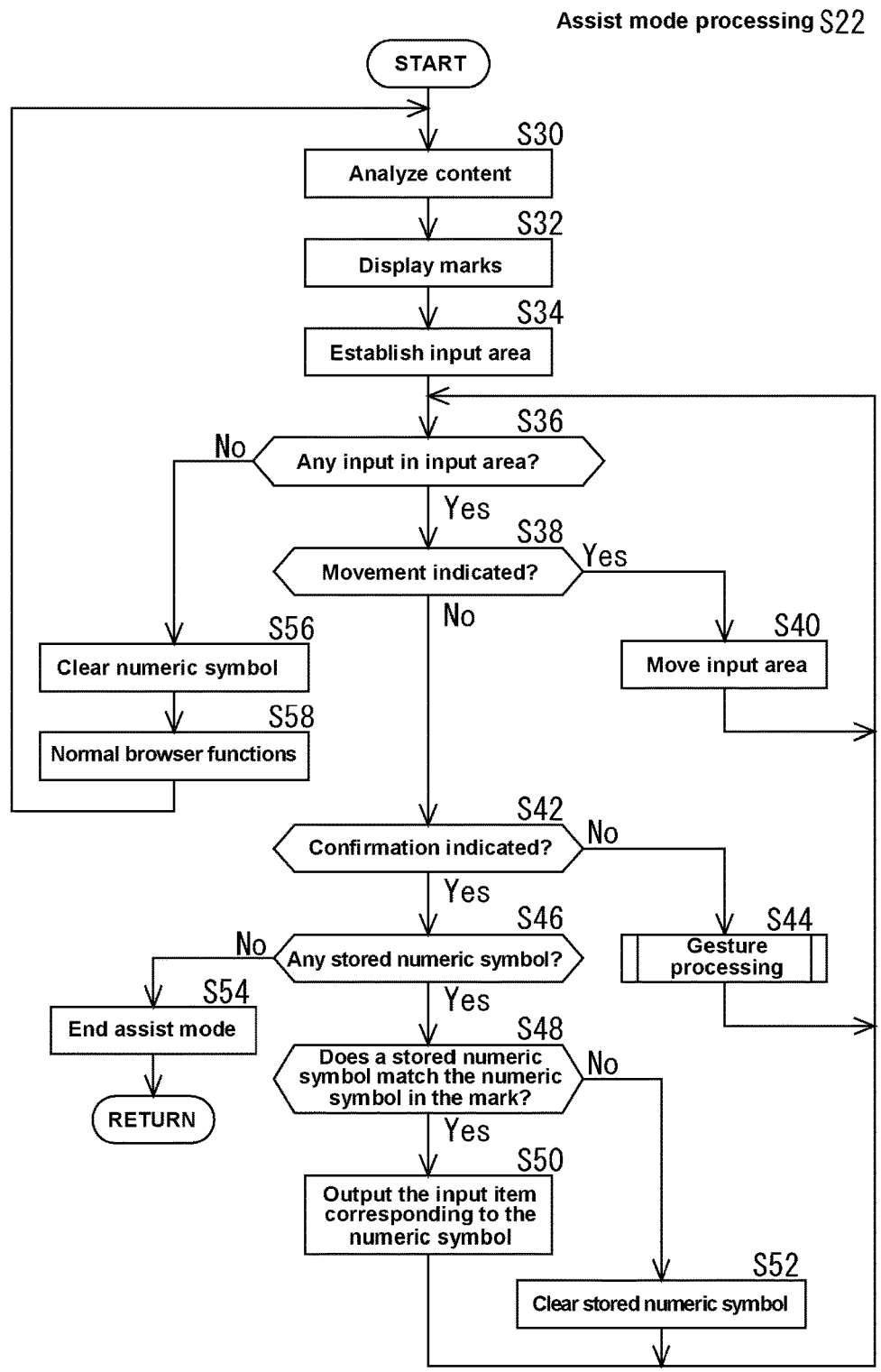
FIG. 6 is another flowchart of an assist mode processing performed by a control unit in accordance with an embodiment.
Figure 7:
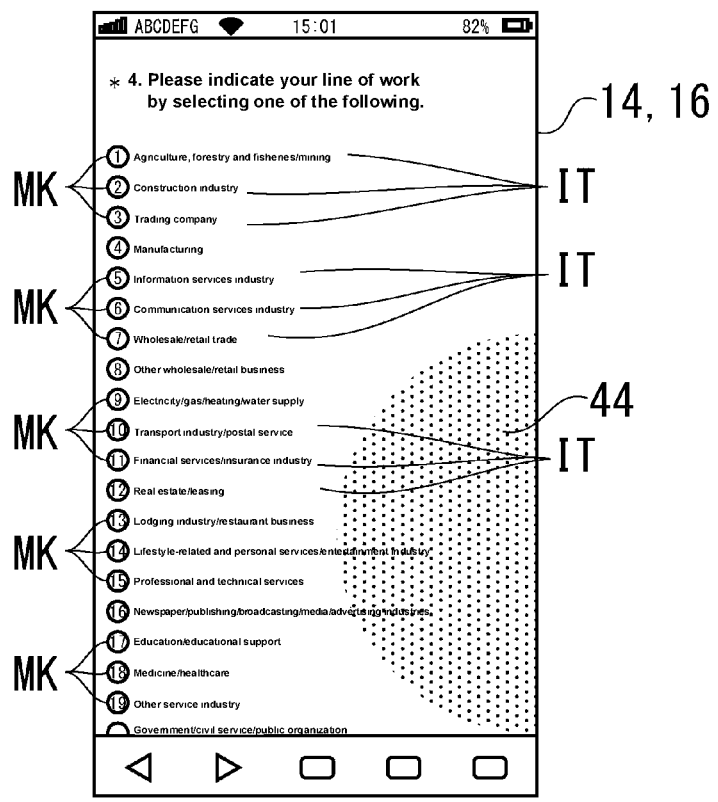
FIG. 7 is an example of a screen displayed on a display unit in an assist mode in accordance with an embodiment.
Figure 8:
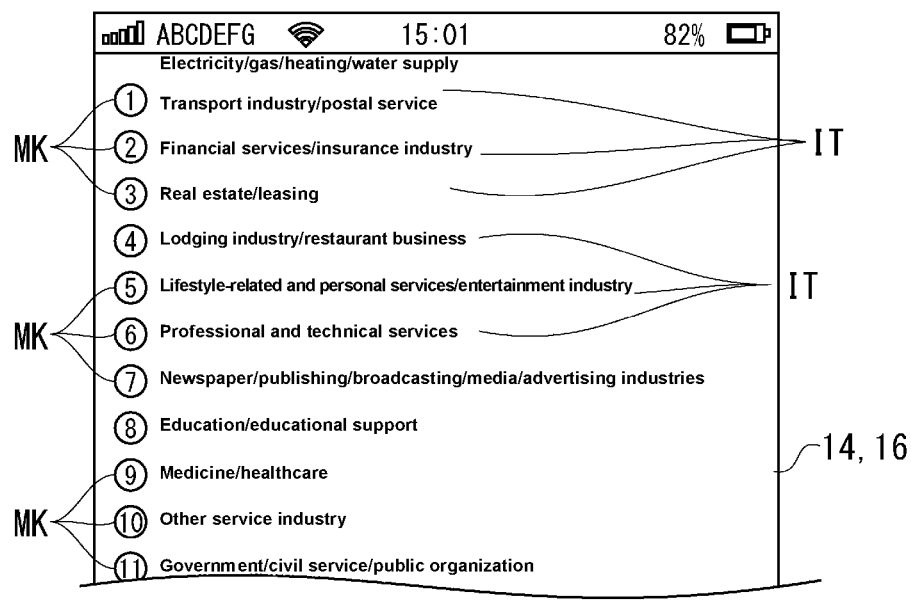
FIG. 8 is another example of a screen displayed on a display unit in an assist mode in accordance with an embodiment.

FIG. 6 is a flowchart of the assist mode processing performed by the control unit 12 in block S22 in accordance with an embodiment. FIG. 7 and FIG. 8 are examples of screens displayed on the display unit 14 in assist mode in accordance with embodiments.

During assist mode processing, as shown in FIG. 6, the search unit 22 analyzes the content displayed or the content to be displayed on the display unit 14, and outputs information on the position of each input item IT on the screen of the display unit 14 or on the input unit 16 to the mark displaying unit 24 (block S30). When information related to each input item IT has been acquired from the search unit 22, the mark displaying unit 24 assigns a number to each input item IT as a mark MK, and displays the marks MK on the display unit 14 (block S32).

Next, the input receiving unit 26 establishes an input area 44 (block S34). In this case, the input receiving unit 26 preferably establishes the input area 44 in a predetermined region from the region in which the switching button 42 is displayed. In this way, after the switching button 42 has been operated, the information processing device 10 allows the user to enter information in the input area 44 using the same finger without having to change how the information processing device 10 is being held. When user input has been received from the input unit 16, the input receiving unit 26 determines whether or not the input was in the input area 44 (block S36). When it has been determined that the input was in the input area 44 (block S36: Yes), the input receiving unit 26 outputs information related to the input to the selection unit 30. The information related to the input is information on the position touched by the user on the input unit 16. When the position touched by the user moves, the information related to the input includes information on the positions touched during the movement and time information for each position.

The selection unit 30 determines whether or not the input is a moving instruction based on the information related to the user input on the input unit 16 inputted from the input receiving unit 26 (block S38). For example, the selection unit 30 determines that the user input is a moving instruction when the time the user touches the initial position is longer than a predetermined amount of time (a long touch) and then the touched position moves. When the selection unit 30 determines that the input is a moving instruction (block S38: Yes), the distance and direction of the moving touch position are combined, and the input area 44 is moved on the screen on the display unit 14 (block S40). For example, when it has been determined that the user touch position has moved, the selection unit 30 moves the input area 44 displayed in the lower right corner in FIG. 3 upward as shown in FIG. 7. As shown in FIG. 7, the selection unit 30 can change the shape of the input area 44 depending on the display position. For example, when the input receiving unit 26 determines that the input is at a central position and a semicircular input area 44 protrudes from the screen, the selection unit 30 may apply the protruding portion as shown in FIG. 3.

When it has been determined that the input is not a moving instruction (block S38: No), the selection unit 30 determines whether or not the user input is an instruction confirming a number inputted using a gesture input GS (block S42). For example, after the user has touched the input unit 16, the selection unit 30 determines that the input was a confirmation instruction when the input is quickly removed from the input unit 16 (a single tap) (block S42: Yes). When it has been determined that the input is not a confirmation instruction but the input of a mark MK using a gesture input GS (block S42: No), the selection unit 30 executes gesture processing to analyze, store and display the gesture input GS (block S44). The gesture processing performed to analyze, store and display gesture inputs GS is described below.

When it has been determined that the input is a confirmation instruction (block S42: Yes), the selection unit 30 determines whether or not the number inputted by the gesture input GS is stored in the memory unit 18 (block S46). When it has been determined that the input is a stored mark MK (block S46: Yes), the selection unit 30 determines whether or not the stored input number matches one of the numbers in the marks MK assigned to input items IT (block S48). When it has been determined that the inputted number matches the number of a mark MK (block S48: Yes), a click event for the input item IT corresponding to the number is outputted to the browser (block S50). The process is then executed again beginning with block S36. By repeatedly executing the process beginning with block S36, the selection unit 30 can change the selection state of two or more input items IT corresponding to two or more marks MK when the user has entered two or more numbers corresponding to two or When, in block S48, a number stored in the memory unit 18 does not match the number of any mark MK (block S48: No), the selection unit 30 clears all of the stored numeric symbols (block S52). When a stored number is displayed in the input area 44, the selection unit 30 also clears the displayed number. The process is then executed again beginning with block S36.

When, in block S46, the selection unit 30 determines that there are no stored numeric symbols (block S46: No), the switching unit 28 releases the assist mode (block S54) and executes the processing in block S14.

When, in block S36, it has been determined that the user input received by the input receiving unit 26 is input in an area other than the input area 44 (block S36: No), the selection unit 30 clears the numeric symbols stored in the memory unit 18 (block S56). Note that the selection unit 30 clears the number displayed in the input area 44 and numbers displayed for input items IT. The content processing unit 20 executes normal browser operations according to the user input (block S58).

For example, during normal browser operations, when the user moves the touch position on the input unit 16 outside of the input area 44, the content processing unit 20 moves the image of the content upward inside the screen on the display unit 14. The process is then executed again beginning with block S30. Because the selection unit 30 clears the numbers of the input items IT in block S56, the mark displaying unit 24 assigns new numbers as marks MK to the input items IT in blocks S30 and S32. Consequently, as shown in FIG. 8, because input item "transport industry/postal service" assigned number "10" is displayed in the top position before scrolling upward, the mark displaying unit 24 assigns number "1" as the mark MK to the input item IT.

Another example of normal browser operations is the direct selection of input items IT by the user. In this case, for example, the mark display unit 24 may continue to display radio buttons 40 for the user to input items IT. The display of radio buttons 40 may be superimposed over the display of marks MK. In this way, the content processing unit 20 can change the selection state of an input item IT when the user touches the area in which a radio button 40 is displayed for the input item IT.

Figure 9:
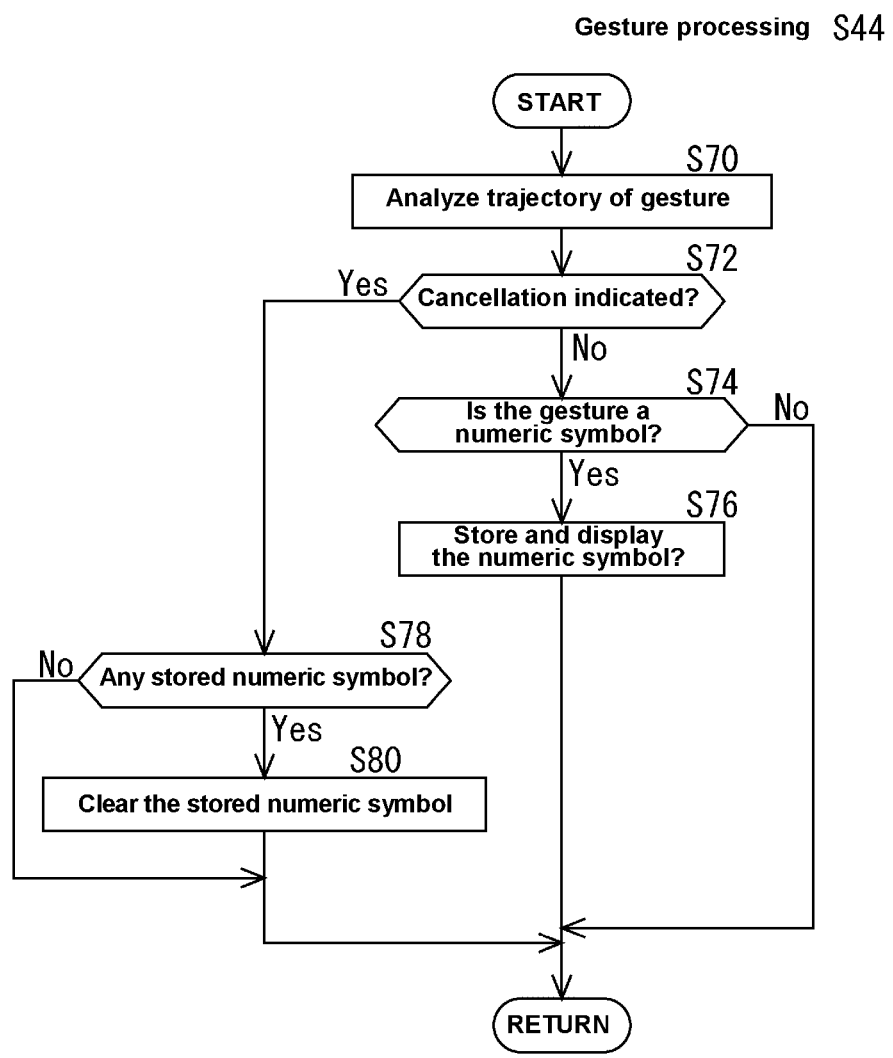
FIG. 9 is a flowchart of a gesture processing performed by a control unit in accordance with an embodiment.

FIG. 9 is a flowchart of the gesture processing performed by the control unit 12 in block S44 in accordance with an embodiment. During gesture processing, as shown in FIG. 9, the selection unit 30 analyzes the trajectory of the user touch positions inside the input area 44 as the trajectory of gesture input GS (block S70). The selection unit 30 determines whether the gesture unit GS whose trajectory has been analyzed is the predetermined gesture input GS for a cancel instruction (block S72). An example of a predetermined gesture input GS for a cancel instruction is moving the touch position on the input unit 16 to the left from the right side (a flick).

When it has been determined that the user input is not a cancel instruction (block S72: No), the selection unit 30 determines whether or not the analyzed gesture input GS is a numeric symbol (block S74). When it has been determined that the analyzed gesture input GS is a numeric symbol (block S74: Yes), the selection unit 30 stores the numeric symbol in the memory unit 18 and displays the numeric symbol in the input area 44 (block S76). For example, when the trajectory of the user's gesture input GS resembles the shape of the numeric symbol "4" stored in the memory unit 18, as shown in FIG. 4, the selection unit 30 determines that the gesture input GS is the numeric symbol "4," and displays the number "4" in the input area 44 as shown in FIG. 3. When it has been determined that the analyzed gesture input GS is not a numeric symbol (block S74: No), the selection unit 30 does not execute block S76. The process is then executed again beginning with block S36 in FIG. 6.

When it has been determined that the user input is a cancel instruction (block S72: Yes), the selection unit 30 determines whether the stored number is in the memory unit 18 (block S78). When it has been determined that a stored numeric symbol is present (block S78: Yes), the selection unit 30 clears at least one numeric symbol stored in the memory unit 18 (block S80). When the cleared numeric symbol is being displayed in the input area 44, the selection unit 30 clears the numeric symbol as well. When it has been determined that the stored numeric symbols are not present (block S78: No), the selection unit 30 does not execute block S80. The process is then executed again beginning with block S36 in FIG. 6.

As explained above, in the information processing device 10, the numbers assigned to input items IT retrieved by the search unit 22 are displayed by the mark displaying unit 24 as marks MK. When mark MK input is received in the form of user gesture input GS in the input area 44, the selection unit 30 determines that a mark MK has been selected and changes the selection state. In this way, the user can easily select an input item IT in the information processing device 10 by entering a mark MK even when the display of input items IT is small. Therefore, in the information processing device 10, the user does not have to select input items IT by enlarging them outside of the screen. In this way, the information processing device 10 can eliminate operations that have to be performed by the user such as enlarging and shrinking to return the screen to normal.

Also, because the search unit 22 searches for input items IT to assign marks MK, the information processing device 10 can realize the effects described above for various types of content with different input items IT. When content is created, the creator also has a greater degree of freedom in constructing content including input items IT. In this way, users can easily and accurately select input items IT even when a creator transfers content designed for a larger personal computer to a smaller smartphone or tablet.

The following is an explanation of partial modifications of the information processing device 10 described above.

In the assist mode of the embodiment described above, when the input receiving unit 26 receives user input in an area outside of the input area 44, the switching unit 28 clears stored numeric symbols and continues in the assist mode. However, when the input receiving unit 26 receives user input in an area outside of the input area 44, the switching unit 28 may also end the assist mode in which marks MK are received. Also, when the selection unit 30 has stored at least one user input in the memory unit 18 and the switching unit 28 has ended reception of marks MK, the input stored in the memory unit 18 may be cleared.

In the embodiment described above, the selection unit 30 receives a single number including numeric symbols with a plurality of digits. However, a range of numbers including a plurality of numbers may be received as input corresponding to marks MK. For example, when "2," "-," and "6" are received in successive order in the input area 44 as user gesture input GS, the selection unit 30 may change the selection state of the input items IT with the marks MK ranging from 2 to 6.

The mark displaying unit 24 may display marks MK for some of the input items IT out of all the input items IT, while not displaying marks MK for the remaining input items IT. In this case, the selection unit 30 may receive input items IT for which marks MK are displayed, and input items IT for which no marks MK are displayed. For example, the mark displaying unit 24 may display marks MK for input items IT whose display size is smaller than predetermined size Th1. An example of predetermined size Th1 is from several mm to several cm in the vertical direction. In this case, the mark displaying unit 24 assigns and displays a mark MK for any displayed input item IT whose size in the vertical direction is less than size Th1, but does not display a mark MK for any remaining displayed input item IT whose size in the vertical direction is greater than size Th1. In this way, the user can select small input items IT by entering marks MK, but select larger input items IT by touching them directly. In this case, the switching unit 28 may automatically receive the input of marks MK for any displayed input item IT whose size is smaller than size Th1.

Figure 10:
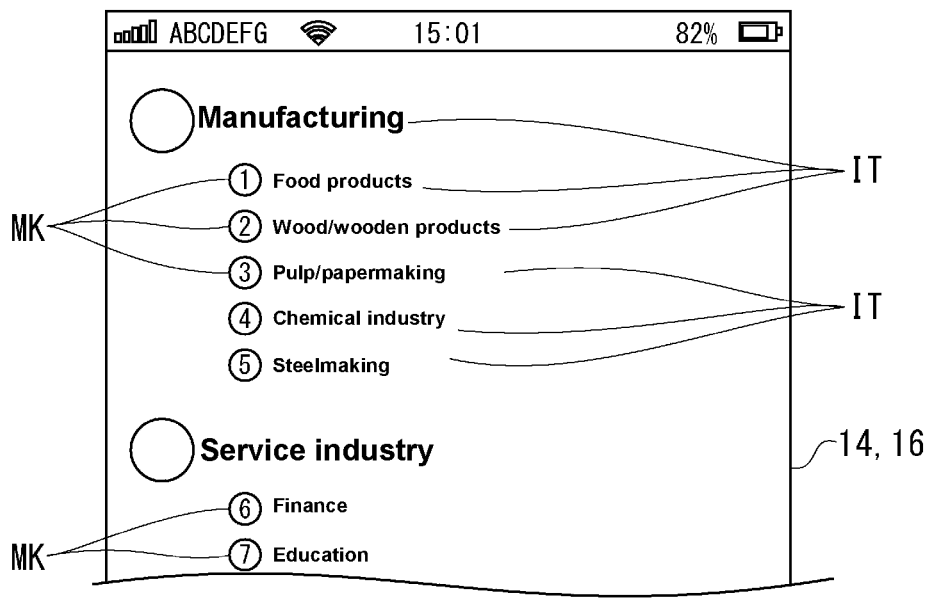
FIG. 10 is a diagram that depicts a display of input items in a hierarchical structure in accordance with an embodiment.

FIG. 10 is a diagram used to explain the display of input items IT in a hierarchical structure in accordance with an embodiment. When there are multiple input items IT in a hierarchical structure, the mark displaying unit 24 does not display marks MK for primary input items IT, but may display marks MK for secondary input items IT on the level lower than the primary input items IT. In this case, as shown in FIG. 10, the mark displaying unit 24 does not display marks MK for input items "manufacturing" and "service industry" in the higher level among the input items IT in the hierarchical structure, but does display marks MK for input items "food products" and "wood/wooden products" in the level below the input items IT in the higher level. In this way, the information processing device 10 can automatically switch to assist mode even when the user has not operated a switching button. The information processing device 10 can allow lower level input items IT that are usually displayed in a small size by entering marks MK, but allow the user to select higher level input items IT that are usually displayed in a large size by directly touching them.

The mark displaying unit 24 may display marks MK for input items IT on condition that the interval between input items IT is smaller than interval threshold value Th2. In this way, the information processing device 10 can switch automatically to the assist mode even when the user has not operated a switching button. Even when the interval between input items IT is narrow and input items IT are very close to each other, the information processing device 10 can allow the user to easily select an input item IT.

The selection unit 30 may display selected marks MK in successive order. For example, when the user has selected marks MK "1," "3," and "8" corresponding to input items IT. "1," "3," and "8" may be displayed in the input area 44.

Figure 11:
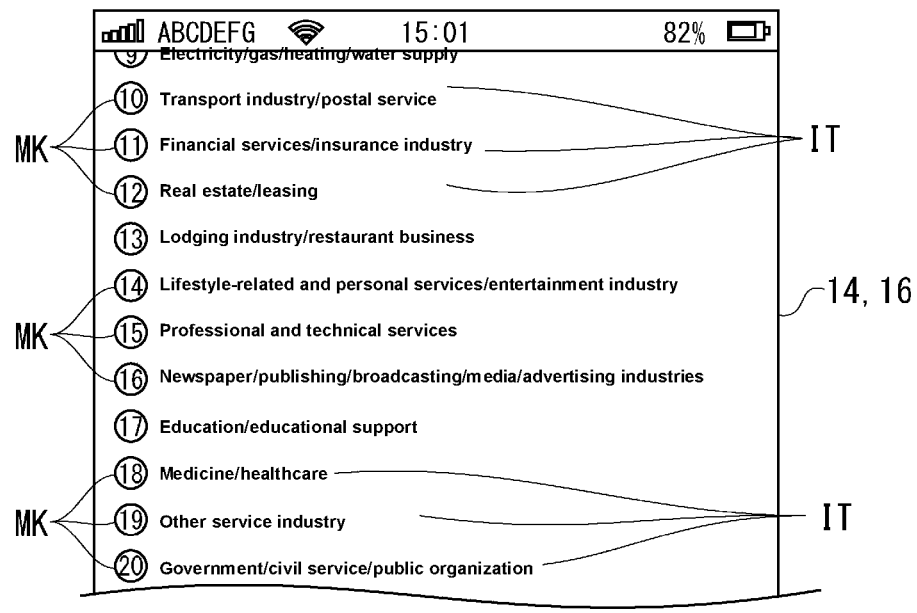
FIG. 11 is a diagram showing a change in an application of marks by a mark displaying unit in accordance with an embodiment.

FIG. 11 is a diagram showing a change in the application of marks MK by the mark displaying unit 24 in accordance with an embodiment. When the display of input items IT on the screen has been changed in response to a change in content, the mark displaying unit 24 may continue to associate the marks MK with input items IT before and after the change. In FIG. 11, for example, the content screen has been scrolled upward from FIG. 3. In this case, the mark displaying unit 24 continues to display the original marks MK 10 through 19 for input items "transport industry/postal service" through "other service industry." Note that the mark displaying unit 24 assigns and displays a new number "20" as a mark MK for newly displayed input item "government/civil service/public organization."

Figure 12:
FIG. 12 is another diagram showing a change in an application of marks by the mark displaying unit in accordance with an embodiment.

FIG. 12 is a diagram showing a change in the application of marks MK by the mark displaying unit 24 in accordance with an embodiment. The mark displaying unit 24 generates, as a mark MK, a character for at least one input item IT of the content, and displays the character on the display in a manner different from the other characters in the input items IT. In the example shown in FIG. 12, the mark displaying unit 24 generates, as a mark MK, the initial character in each input item IT. The mark displaying unit 24 surrounds the initial character in a box which sets it apart from the other characters. The initial character can be set apart by highlighting it with a fluorescent color, changing the color of the character, or underlining the character.

In the embodiment described above, the input receiving unit 26 establishes an input area 44 with a partially circular shape. However, the input receiving unit 26 can change the shape and location of the input area 44 in response to a user instruction. The input receiving unit 26 can also change the size, transparency, and initial position of the input area 44 in response to a user instruction.

In the embodiment described above, the mark displaying unit 24 displays marks MK with the same round shape as the radio buttons 40. However, the mark displaying unit 24 can change the shape of the marks MK to conform to the shape of the radio buttons 40 or in response to a user instruction.

In the embodiment described above, the switching unit 28 fixes the location of the switching button 42. However, switching unit 28 can move the location of the switching button 42 in response to a user instruction. For example, after the user has pressed down for a long period of time on the area with the switching button 42 and then moves the touch position (touch-and-drag), the switching unit 28 can move the switching button 42 in accordance with the movement.

In the embodiment described above, the selection unit 30 receives a gesture input GS as a numeric symbol when the shape of the gesture input GS resembles the shape of a numeric symbol. However, this embodiment is not limiting. For example, the selection unit 30 may determine which numeric symbol has been inputted based on a predetermined gesture input GS linked to that numeric symbol. More specifically, a gesture input GS moving in a straight horizontal line may be established for the numeric symbol "1," a gesture input GS moving in a straight vertical line may be established for the numeric symbol "2," and a gesture input GS moving in a circle may be established for the numeric symbol "3." In this way, the selection unit 30 can improve the accuracy for determining numeric symbols resembling shapes such as "5" and "6."

The input receiving unit 26 may establish the entire content display area as the input area 44 for the user to input marks MK.

In the assist mode, the switching unit 28 may display a switching button for ending the assist mode on the display unit 14.

When the input corresponding to a previously selected input item IT is changed, the selection unit 30 may change the state of the input item IT from selected to unselected.

In the embodiment described above, a webpage was used as the example of content. However, the information processing device 10 can be applied to other types of content including input items IT that can be selected.

Figure 13:
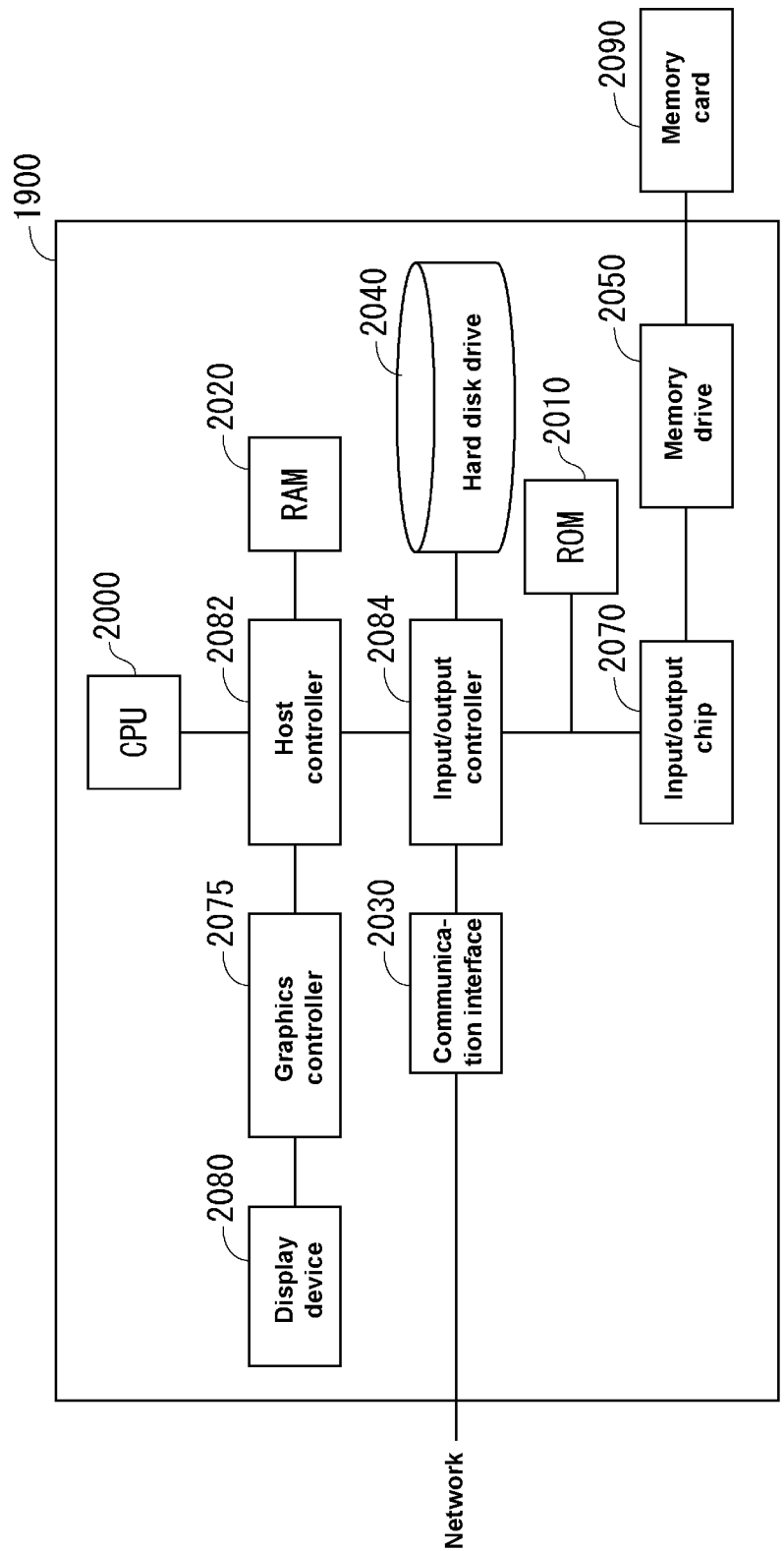
FIG. 13 shows an example of a hardware configuration for a computer in accordance with an embodiment.

FIG. 13 shows an example of a hardware configuration for a computer 1900 in accordance with an embodiment. The computer 1900 related to the present embodiment is an example of an information processing device 10. The computer 1900 in the present embodiment is equipped with a CPU peripheral portion having a CPU 2000, RAM 2020, graphics controller 2075 and display device 2080 connected to each other by a host controller 2082, an input/output portion having a communication interface 2030, and a hard disk drive 2040 connected to the host controller 2082 by an input/output controller 2084, and a legacy input/output portion having a ROM 2010, memory drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units. The graphics controller 2075 acquires the image data generated in the frame buffer of the RAM 2020 by the CPU 2000 and other units, and displays this image data on the display device 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, and a hard disk drive 2040. The communication interface 2030 communicates with the other devices via a network. The hard disk drive 2040 stores the programs and data used by the CPU 2000 in the computer 1900.

The input/output controller 2084 is connected to the ROM 2010, the memory drive 2050, and the relatively low-speed input/output device of the input/output chip 2070. The ROM 2010 stores the boot program executed by the computer 1900 at startup and/or programs relying on hardware in the computer 1900. The memory drive 2050 reads programs or data from a memory card 2090, and provides the programs and data to the hard disk drive 2040 via the RAM 2020. The input/output chip 2070 connects the memory drive 2050 to the input/output controller 2084, and various types of input/output devices are connected to the input/output controller 2084 via a parallel port, serial port, keyboard port, or mouse port, etc.

A program provided to the hard disk drive 2040 via the RAM 2020 is stored on a recording medium such as a memory card 2090 or an IC card provided by the user. A program is read from the recording medium, installed in the hard disk drive 2040 inside the computer 1900 via the RAM 2020, and executed by the CPU 2000.

Programs installed in the computer 1900 to enable the computer 1900 to operate as an information processing device 10 include a content module, search module, mark display module, input receiving module, switching module, and selection module. These programs or modules work with the CPU 2000 and other components to cause the computer 1900 to operate as the content module, search module, mark display module, input receiving module, switching module, and selection module.

The information processing operations written in these programs are specific means activated by reading the programs to the computer 1900 so that the software cooperates with the various types of hardware resources described above. These specific means operate as the content module, search module, mark display module, input receiving module, switching module, and selection module. These specific means realize operations and the processing of information in the computer 1900 of the present embodiment to construct a dedicated information processing device 10 for the intended purpose.

For example, when the computer 1900 communicates with an external device, the CPU 2000 executes the communication program loaded in the RAM 2020, and instructs the communication interface 2030 in the communication processing on the basis of the processing content described in the communication program. The communication interface 2030 is controlled by the CPU 2000, and reads the transmitted data stored in the transmission buffer region of a memory device such as the RAM 2020, hard disk drive 2040, or memory card 2090, or writes reception data received from the network to a reception buffer region of the storage device. In this way, the communication interface 2030 exchanges data with a storage device using the direct memory access (DMA) method. Alternatively, the CPU 2000 may exchange data by retrieving data from the source storage device or communication interface 2030, and writing the data to the destination communication interface 2030 or storage device.

Also, the CPU 2000 writes all of the data or the necessary data to the RAM 2020 via, for example, a DMA transfer, from files or databases stored in an external storage device such as a hard disk drive 2040 or a memory drive 2050 (memory card 2090), and performs various types of processing on the data in the RAM 2020. The CPU 2000 then writes the processed data to an external storage device via, for example, a DMA transfer. Because the RAM 2020 temporarily stores the contents of the external storage device during this process, the RAM 2020 and the external storage device are generally referred to in the present embodiment as memory, a memory unit, or a memory device. The various types of information in the programs, data, tables and databases of the present embodiment are stored in these memory devices, and are the targets of information processing. The CPU 2000 can hold some of the RAM 2020 in cache memory, and read and write data to the cache memory. In this case, the cache memory performs some of the operations of the RAM 2020. Therefore, this division is excluded in the present embodiment. Cache memory is included in the RAM 2020, the memory, and/or the memory device.

The CPU 2000 also performs various types of processing on data read from the RAM 2020 including the operations, processing, condition determination, and information retrieval and substitution described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as greater than, less than, equal to or greater than, equal to or less than or equal to have been satisfied. When a condition has been satisfied (or not satisfied), the process branches to a different sequence of instructions or calls up a subroutine.

A program or module described above can be stored in a recording medium of an external unit. Instead of a memory card 2090, the recording medium can be an optical recording medium such as a DVD or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

In accordance with an embodiment, an information processing device may including a search unit for searching displayed content for input items, the input items being selections inputted by a user; a mark displaying unit displaying a different mark associated with each of the retrieved input items; an input receiving unit for receiving input from the user; and a selection unit for changing the selection state of each input item corresponding to a mark in response to input corresponding to the mark being received by the input receiving unit. Other embodiments may implement this information processing device as a computer program product and/or a method corresponding thereto.

In accordance with another embodiment, an information processing device is provided. The information processing device comprises a search unit for searching displayed content for input items, the input items being selections inputted by a user; a mark displaying unit displaying a different mark associated with each of the retrieved input items; an input receiving unit for receiving input from the user; and a selection unit for changing the selection state of each input item corresponding to a mark in response to input corresponding to the mark being received by the input receiving unit.

In accordance with another embodiment or the information processing device embodiment above, the selection unit can change the selection state of the input item corresponding to a mark in response to the input receiving unit receiving a gesture from the user as input corresponding to the mark.

In accordance with another embodiment or the information processing device embodiment above, the selection unit can confirm the selection of an input item corresponding to the mark in response to receiving an instruction from the user.

In accordance with another embodiment or the information processing device embodiment above, the input receiving unit can establish an input area on the screen for the user to enter marks.

In accordance with another embodiment or the information processing device embodiment above, the input receiving unit can further comprise a switching unit for ending the reception of marks when user input is received in an area outside of the input area.

In accordance with another embodiment or the information processing device embodiment above, the selection unit can store at least one input from the user in the storage unit, and clear the input stored in the storage unit when the switching unit ends the reception of marks.

In accordance with another embodiment or the information processing device embodiment above, the selection unit can clear at least one input stored in the storage unit when a cancel instruction is inputted by the user.

In accordance with another embodiment or the information processing device embodiment above, the mark displaying unit can display numbers as marks, and the input receiving unit can receive numerical gesture inputs from the user as input corresponding to the marks.

In accordance with another embodiment or the information processing device embodiment above, the selection unit can receive a range of numbers as input corresponding to the marks.

In accordance with another embodiment or the information processing device embodiment above, the selection unit can change the selection state of two or more input items corresponding to two or more marks in response to the user inputting two or more inputs corresponding to two or more marks.

In accordance with another embodiment or the information processing device embodiment above, the mark displaying unit can maintain the display of an input button for the user to input an input item.

In accordance with another embodiment or the information processing device embodiment above, the mark displaying unit can display marks for some of the input items and not display marks for the remaining input items, and the selection unit can receive input for input items displaying marks and input for input items not displaying marks.

In accordance with another embodiment or the information processing device embodiment above, the mark displaying unit can display marks for input items having a display size smaller than a predetermined size.

In accordance with another embodiment or the information processing device embodiment above, the information processing device can further comprise a switching unit for starting reception of mark input when the display size of any one of the input items is smaller than a predetermined size.

In accordance with another embodiment or the information processing device embodiment above, the mark displaying unit can avoid the display of marks for primary input items and can display marks for secondary items in a level lower than the primary input items among a plurality of items having a hierarchical structure.

In accordance with another embodiment or the information processing device embodiment above, the mark displaying unit can display marks for input items on condition that the interval between inputted items is less than an interval threshold value.

In accordance with another embodiment or the information processing device embodiment above, the selection unit can display selected marks in sequential order.

In accordance with another embodiment or the information processing device embodiment above, the selection unit can display selected marks, and avoid a display of a mark in response to receiving a cancel instruction for the mark.

In accordance with another embodiment or the information processing device embodiment above, the mark displaying unit can maintain input items and the corresponding marks displayed before and after the change in the display when the display of an input item on the screen has been changed in response to a change in the display of content.

In accordance with another embodiment or the information processing device embodiment above, the mark displaying unit can generate, as a mark, a character for at least one input item of the content, and display the character on the display in a manner different from other characters for input items.

In accordance with another embodiment, a program is provided. The program causing a computer to operation as a search unit for searching displayed content for input items, the input items being selections inputted by a user; a mark displaying unit displaying a different mark associated with each of the retrieved input items; an input receiving unit for receiving input from the user; and a selection unit for changing the selection state of each input item corresponding to a mark in response to input corresponding to the mark being received by the input receiving unit.

In accordance with another embodiment, a method is provided. The method comprises searching displayed content for input items, the input items being selections inputted by a user; displaying a different mark associated with each of the retrieved input items; receiving input from the user; and changing the selection state of each input item corresponding to a mark in response to input corresponding to the mark being received by the input receiving unit.

The technical scope of embodiments herein should not be construed as limiting. The possibility of many changes and improvements to these embodiments should be apparent to those skilled in the art. Embodiments including these changes and improvements are within the technical scope, as should be clear from the description of the claims.

The order of execution for operations and processes in the devices, systems, programs and methods described in the claims, description and drawings was described using terms such as "previous" and "prior." However, these operations and processes can be realized in any order as long as the output of the previous process is used by the subsequent process. The operational flow in the claims, description and drawing were explained using terms such as "first" and "next" for the sake of convenience. However, the operational flow does not necessarily have to be executed in this order.

What is claimed is:

1. A system, comprising:
    a search unit configured to search content displayed on a display device for input items, wherein the input items are selections inputted by a user;
    a mark displaying unit configured to display different marks, each associated with each of the input items, wherein the mark displaying unit is configured to display numbers as the different marks;
    an input receiving unit configured to receive a subsequent input from the user comprising a numerical gesture input comprising a range of numbers, wherein the input receiving unit is further configured to establish an input area on a screen of the system to receive the subsequent input from the user;
    a selection unit configured to change a selection state of each item of the input items corresponding to a mark of the different marks in response to the subsequent input received corresponding to that mark; and
    a switching unit configured to switch from a normal mode to an assist mode in response to input to a switching button by the user,
    wherein the numerical gesture input further comprises a numerical gesture input representing a first number comprising 2, a numerical gesture input representing a horizontal line, and a numerical gesture input representing a second number comprising 6;
    wherein the selection unit is further configured to change a selection state for each respective item corresponding to the first number, the second number, and each respective number between the first number and the second number; and
    wherein the mark displaying unit is further configured to maintain a display of an input button, the input button configured to enable an input of the input items.

* * * * *